(12) United States Patent
Muranaka et al.

(10) Patent No.: US 10,996,581 B2
(45) Date of Patent: May 4, 2021

(54) CONDUCTIVE MEMBER

(71) Applicant: CANON KABUSHIKI KAISHA, Tokyo (JP)

(72) Inventors: Norifumi Muranaka, Yokohama (JP); Satoru Yamada, Numazu (JP); Kazuhiro Yamauchi, Suntou-gun (JP); Seiji Tsuru, Susono (JP); Yuka Muranaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 15/722,464

(22) Filed: Oct. 2, 2017

(65) Prior Publication Data
US 2018/0039201 A1 Feb. 8, 2018

Related U.S. Application Data

(60) Division of application No. 14/931,791, filed on Nov. 3, 2015, now Pat. No. 9,811,021, which is a division
(Continued)

(30) Foreign Application Priority Data

Mar. 29, 2011 (JP) .................................. 2011-072404

(51) Int. Cl.
*G03G 15/02* (2006.01)
*B32B 15/06* (2006.01)
(Continued)

(52) U.S. Cl.
CPC .......... *G03G 15/0233* (2013.01); *B05D 3/007* (2013.01); *B32B 1/08* (2013.01);
(Continued)

(58) Field of Classification Search
CPC .......... B05D 3/007; B32B 15/06; B32B 15/18; B32B 25/02; B32B 25/14; B32B 1/08;
(Continued)

(56) References Cited

U.S. PATENT DOCUMENTS 3,320,317 A 5/1967 Rogers et al.
3,625,684 A 12/1971 Poot et al.
(Continued)

FOREIGN PATENT DOCUMENTS

CA 1 140 332 2/1983
CN 1366002 8/2002
(Continued)

OTHER PUBLICATIONS

Jackson, M.B., Edmond, L.N., Varley, R.J. and Warden, P.G. (1993), Toughening epoxy resins with polyepichlorohydrin. J. Appl. Polym. Sci., 48: 1259-1269. doi: 10.1002/app.1993.070480714 (Year: 1993).*

*Primary Examiner* — John D Freeman
(74) *Attorney, Agent, or Firm* — Venable LLP

(57) ABSTRACT

Provided is such a conductive member that a change in its electrical resistance value caused by its long-term use is reduced to the extent possible. The conductive member has a conductive support and a conductive layer, the conductive layer contains a rubber composition formed of a modified epichlorohydrin rubber, and the modified epichlorohydrin rubber has a unit represented by the following formula (1). In the formula (1), R1, R2, and R3 each independently represent hydrogen or a saturated hydrocarbon group having 1 to 18 carbon atoms.

(Continued)

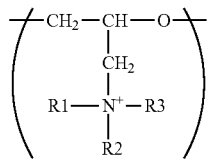

Formula (1)

6 Claims, 3 Drawing Sheets

Related U.S. Application Data of application No. 13/523,763, filed on Jun. 14, 2012, now abandoned, which is a continuation of application No. PCT/JP2012/001915, filed on Mar. 21, 2012.

(51) Int. Cl.
| | | |
|---|---|---|
| *B32B 25/14* | (2006.01) | |
| *B32B 15/18* | (2006.01) | |
| *B32B 25/02* | (2006.01) | |
| *B32B 1/08* | (2006.01) | |
| *G03G 15/08* | (2006.01) | |
| *G03G 15/16* | (2006.01) | |
| *B05D 3/00* | (2006.01) | |

(52) U.S. Cl.
CPC .............. *B32B 15/06* (2013.01); *B32B 15/18* (2013.01); *B32B 25/02* (2013.01); *B32B 25/14* (2013.01); *G03G 15/0818* (2013.01); *G03G 15/1685* (2013.01); *B32B 2264/104* (2013.01); *B32B 2264/108* (2013.01); *B32B 2307/202* (2013.01); *B32B 2457/00* (2013.01); *Y10T 428/31522* (2015.04); *Y10T 428/31855* (2015.04)

(58) Field of Classification Search
CPC ........ B32B 2264/104; B32B 2264/108; B32B 2307/202; B32B 2457/00; G03G 15/0233; G03G 15/0818; G03G 15/1685; Y10T 428/31522; Y10T 428/31855
See application file for complete search history.

(56) References Cited

U.S. PATENT DOCUMENTS

| | | | |
|---|---|---|---|
| 3,640,765 A | | 2/1972 | DiStefano et al. |
| 3,640,766 A | | 2/1972 | Jursich et al. |
| 5,459,558 A | * | 10/1995 | Ishiyama ........... G03G 15/0233 |
| | | | 361/225 |
| 6,127,622 A | | 10/2000 | Yamada et al. |
| 6,400,919 B1 | | 6/2002 | Inoue et al. |
| 6,558,781 B1 | | 5/2003 | Fuei et al. |
| 7,947,339 B2 | | 5/2011 | Yamauchi et al. |
| 8,090,287 B2 | | 6/2012 | Hoshio |
| 8,668,987 B2 | | 3/2014 | Yamauchi et al. |
| 9,086,643 B2 | | 7/2015 | Kikuchi et al. |
| 9,236,159 B2 | | 1/2016 | Yonemaru et al. |
| 2004/0110617 A1 | | 6/2004 | Mizumoto |
| 2004/0265006 A1 | | 12/2004 | Taniguchi et al. |
| 2006/0047054 A1 | | 3/2006 | Wang et al. |
| 2007/0041752 A1 | | 2/2007 | Mizumoto et al. |
| 2007/0254792 A1 | | 11/2007 | Mizumoto |
| 2007/0271792 A1 | | 11/2007 | Kagawa et al. |
| 2009/0162092 A1 | | 6/2009 | Hoshio |
| 2010/0069208 A1 | | 3/2010 | Marui et al. |
| 2011/0052262 A1 | | 3/2011 | Tomari et al. |
| 2012/0020700 A1 | | 1/2012 | Yamada et al. |
| 2012/0027456 A1 | | 2/2012 | Muranaka et al. |
| 2012/0070188 A1 | | 3/2012 | Hirakoso et al. |
| 2012/0296049 A1 | | 11/2012 | Yonemaru et al. |
| 2012/0308261 A1 | | 12/2012 | Tsuru et al. |

FOREIGN PATENT DOCUMENTS

| | | |
|---|---|---|
| CN | 101063854 | 10/2007 |
| CN | 101470382 | 7/2009 |
| EP | 1 069 482 | 1/2001 |
| JP | S46-000284 | 1/1971 |
| JP | 09-132677 | 5/1997 |
| JP | 2000-017118 | 1/2000 |
| JP | 2001-092221 | 4/2001 |
| JP | 2001-166563 | 6/2001 |
| JP | 2001-273815 | 10/2001 |
| JP | 2002-226711 | 8/2002 |
| JP | 2003-202722 | 7/2003 |
| JP | 2003-221474 | 8/2003 |
| JP | 2003-253112 | 9/2003 |
| JP | 2004-258277 | 9/2004 |
| JP | 2005-321749 | 11/2005 |
| JP | 2006-189894 | 7/2006 |
| JP | 3935445 | 6/2007 |
| JP | 2008-058633 | 3/2008 |
| JP | 2009-156970 | 7/2009 |
| JP | 2011072404 A | 4/2011 |
| WO | 2011/081152 | 7/2011 |

* cited by examiner

CONDUCTIVE MEMBER

CROSS-REFERENCE TO RELATED APPLICATIONS

This application is division of application Ser. No. 14/931,791 filed Nov. 3, 2015, which in turn is a division of application Ser. No. 13/523,763 filed Jun. 14, 2012 (abandoned), which in turn is a continuation of International Application No. PCT/JP2012/001915, filed Mar. 21, 2012, which claims the benefit of Japanese Patent Application No. 2011-072404, filed Mar. 29, 2011.

BACKGROUND OF THE INVENTION

Field of the Invention

The present invention relates to a conductive member to be used in an electrophotographic image-forming apparatus.

Description of the Related Art

Additional lengthening of the lifetime of an electrophotographic apparatus has been required in recent years. Accordingly, slight changes in its physical properties that have not been perceived as problems so far may cause image defects owing to its long-term use. In particular, a change in its electrical resistance value serves as an important factor for high durability of a conductive member.

A conductive member including a conductive layer obtained by adding an ionic conductive agent to a polar polymer such as a hydrin rubber to adjust its electrical resistance value has been proposed as such a conductive member that unevenness in its electrical resistance value has been alleviated. However, when the ionic conductive agent is used, the ionic conductive agent may be unevenly distributed (localized) in the conductive layer owing to long-term use of the member. Possible causes for the foregoing are as described below. The time period for which a DC voltage is applied to the conductive member at the time of its use is long. In addition, as the conductive layer repeatedly receives a stress, an ion exchange group of the ionic conductive agent undergoes ionic dissociation, and hence an anion and a cation move in the conductive layer to be unevenly distributed. In particular, the uneven distribution of the ion exchange group in the conductive layer increases the electrical resistance value of the conductive member.

In addition, the long-term application of the DC potential to the conductive member and the repeated application of the stress to the conductive layer prompt the bleedout of a low-molecular weight component in the conductive member toward the surface of the conductive layer. The bleedout of the low-molecular weight component toward the surface of the conductive layer leads to the contamination of the surface of a photosensitive member.

To cope with such problems, in Japanese Patent Application Laid-Open No. 2006-189894, a specific quaternary ammonium salt capable of reducing the electrical resistance value even when added in a small amount is used as an ionic conductive agent. In addition, in Japanese Patent Application Laid-Open No. 2001-273815, the bleeding and blooming of an ionic conductive agent are suppressed by using a quaternary ammonium salt having an OH group.

SUMMARY OF THE INVENTION

As a result of investigations on the inventions according to Patent Literature 1 and Patent Literature 2 conducted by the inventors of the present invention, however, the inventors have acknowledged that the movement and uneven distribution of a quaternary ammonium ion and an anion in the conductive layer are inevitable even now, and hence the inventions are still insufficient to solve the problems. In view of the foregoing, the present invention is directed to providing a conductive member whose electrical resistance value hardly changes even after its long-term use.

According to a first aspect of the present invention, there is provided a conductive member, including: a conductive support; and a conductive layer, in which the conductive layer contains a modified epichlorohydrin rubber having a unit represented by the following formula (1) and an anion.

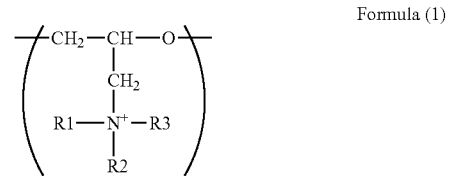

Formula (1)

In the formula (1), R1, R2, and R3 each independently represent hydrogen or a saturated hydrocarbon group having 1 to 18 carbon atoms.

According to a second aspect of the present invention, there is also provided a process cartridge, which is attachably/detachably mounted to a main body of an electrophotographic apparatus, the process cartridge including the above-mentioned conductive member as at least one member selected from a charging member and a developing member. According to a third embodiment of the present invention, there is also provided an electrophotographic apparatus, including the above-mentioned conductive member as at least one member selected from a charging member and a developing member.

According to the present invention, there is provided such a conductive member that a change in its electrical resistance value caused by its long-term use is reduced to the extent possible.

Further features of the present invention will become apparent from the following description of exemplary embodiments with reference to the attached drawings.

DESCRIPTION OF THE EMBODIMENTS

Figure 1:
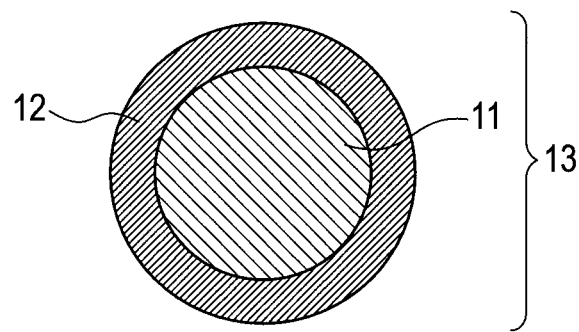
FIG. 1 is a sectional view of a conductive member according to the present invention.

FIG. 1 is a schematic construction view of a conductive member according to the present invention. The outer periphery of a conductive support 11 is provided with a conductive layer 12. The conductive layer 12 may have a multilayer structure including two or more layers.

The conductive member according to the present invention can be used as a charging member (charging roller), a developing member (developing roller), a transferring member (transfer roller), an antistatic member, or a conveying member such as a sheet-feeding roller in an electrophotographic image-forming apparatus. In addition, the conductive member is suitable for a conductive member to be stationarily energized such as a charging blade or a transferring pad. Hereinafter, the present invention is described by way of a charging roller, a developing roller, or the like as a representative example of the conductive member.

<Conductive Support>

The conductive support has conductivity for feeding the surface of a charging roller through the support. The conductive support is, for example, a column obtained by plating the surface of a carbon steel alloy with nickel having a thickness of about 5 μm. Metals such as iron, aluminum, titanium, copper, and nickel, alloys containing these metals such as stainless steel, duralumin, brass, and bronze, and composite materials obtained by hardening carbon black or carbon fibers with plastic can be given as examples of any other material for constituting the conductive support. Further, a known material that is rigid and shows conductivity can be used. In addition, the shape can be a cylindrical shape whose central portion has been hollowed out as well as the columnar shape.

<Conductive Layer>

The conductive layer contains a modified epichlorohydrin rubber having a unit represented by the following formula (1) and an anion.

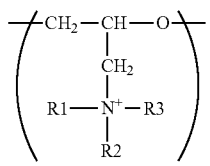

Formula (1)

In the formula (1), R1, R2, and R3 each independently represent hydrogen or a saturated hydrocarbon group having 1 to 18 carbon atoms.

(Epichlorohydrin Rubber)

An epichlorohydrin rubber, which is a raw material for the modified epichlorohydrin rubber according to the present invention, is a general term for rubbers each having a unit derived from epichlorohydrin represented by the following formula (2).

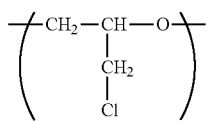

Formula (2)

Specific examples of the epichlorohydrin rubber include a homopolymer formed of the unit represented by the formula (2) alone, an epichlorohydrin-alkylene oxide copolymer formed of the unit represented by the formula (2) and an alkylene oxide unit represented by the following formula (3), and further, an epichlorohydrin-alkylene oxide-allyl glycidyl ether terpolymer having a unit derived from allyl glycidyl ether represented by the following formula (4) in addition to the units represented by the formula (2) and the formula (3).

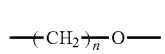

Formula (3)

In the formula (3), n represents an integer of 1 to 3.

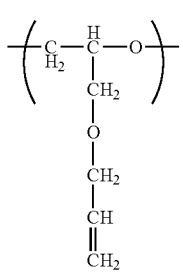

Formula (4)

In particular, the terpolymer having the units represented by the formula (2), the formula (3), and the formula (4) is suitably used as the modified epichlorohydrin rubber according to the present invention because its vulcanization rate and vulcanization density can be easily adjusted by virtue of the presence of a double bond portion in the unit derived from allyl glycidyl ether.

In addition, the electrical resistance value of the epichlorohydrin rubber having the units represented by the formula (2) to the formula (4) and the extent of the variation of the electrical resistance value caused by a temperature/humidity environment can be controlled depending on the molar ratio of each unit. When the rubber is incorporated into the conductive layer of a conductive member for electrophotography, the molar ratios of the unit derived from epichlorohydrin, the unit derived from ethylene oxide, and the unit derived from allyl glycidyl ether are, for example, 19 mol % or more and 75 mol % or less, 24 mol % or more and 80 mol % or less, and 1 mol % or more and 15 mol % or less, respectively. More preferred molar ratios of the unit derived from epichlorohydrin, the unit derived from ethylene oxide, and the unit derived from allyl glycidyl ether are 19 mol % or more and 45 mol % or less, 50 mol % or more and 80 mol % or less, and 1 mol % or more and 10 mol % or less, respectively. When such molar ratios are adopted, the electrical resistance value can be reduced and the variation of the electrical resistance value caused by the temperature/humidity environment can be suppressed.

(Modified Epichlorohydrin Rubber)

The modified epichlorohydrin rubber according to the present invention is such that at least one unit of the units derived from epichlorohydrin in the epichlorohydrin rubber is the unit represented by the formula (1). That is, the modified epichlorohydrin rubber according to the present invention has a quaternary ammonium ion chemically bonded in a molecule thereof. A conductive layer expresses its ionic conductivity as a result of the movement of an anion, which is a carrier molecule present in the conductive layer, in the conductive layer. In the conductive layer according to the present invention, however, the quaternary ammonium ion as a cation is chemically bonded to the modified epichlorohydrin rubber as a binder for the conductive layer, and hence excessive movement of an anion as a carrier ion in the conductive layer is suppressed. As a result, in the conductive member according to the present invention, the exudation (bleeding) of an ionic conductive component from the inside of the conductive layer toward its surface is suppressed. In addition, in a state in which the conductive member according to the present invention is used as a charging member and the member is placed so as to abut on a photosensitive member, an increase in electrical resistance of the conductive layer hardly occurs even when a high DC voltage is applied between the charging member and the photosensitive member.

In the unit represented by the formula (1), R1, R2, and R3 each independently represent hydrogen or a saturated hydrocarbon group having 1 or more and 18 or less carbon atoms, particularly preferably a saturated hydrocarbon group having 1 or more and 8 or less carbon atoms. When the number of carbon atoms of the saturated hydrocarbon group is excessively large, the ion exchange ability of an amine compound per unit mass reduces owing to an increase in its molecular weight in association with an increase in number of carbon atoms. As a result, conductivity required for the conductive layer is hardly obtained.

The modified epichlorohydrin rubber having the unit represented by the formula (1) can be obtained by dechlorinating a chlorine atom in an alkylene chloride site in a unit of an unmodified epichlorohydrin rubber through a nucleophilic substitution reaction with the amine compound. That is, a quaternary ammonium group having ionic conductivity is introduced into an epichlorohydrin rubber having excellent electrical characteristics and excellent dynamical characteristics by means of a polymer reaction, the rubber being incorporated as a binder polymer into the elastic layer of a charging member. It should be noted that an ionic conductive member having rubber elasticity can be obtained also by: polymerizing a copolymer formed of an ionic conductive monomer having an ion exchange group, and a monomer having a diene-based or crosslinkable functional group and having a glass transition temperature of 0° C. or less; and crosslinking the resultant copolymer. However, it is not easy to obtain a polymer of the ionic conductive monomer having an ion exchange group because the monomer generally has low polymerizability. As a result, dynamical characteristics required for a charging roller are not sufficiently obtained.

A method for substitution with the amine compound is not particularly limited as long as the nucleophilic substitution reaction between the chlorine atom of the alkylene chloride portion which the epichlorohydrin rubber has and the amine compound progresses. For example, an approach involving dissolving the epichlorohydrin rubber in an organic solvent such as dimethylformamide (DMF) by means of a solution reaction and adding the amine compound to the solution, or an approach involving adding the amine compound at the rubber kneading stage of the epichlorohydrin rubber may be employed. Further, the chlorine atom of the alkylene chloride portion of the unit derived from epichlorohydrin may be substituted with a primary amine by utilizing, for example, the Delepine reaction or the Gabriel reaction. When the amine compound is added at the time of the rubber kneading, simultaneous addition of a vulcanization accelerator with the amine compound causes a reaction between the amine compound and the vulcanization accelerator, which may inhibit the nucleophilic substitution reaction with the chlorine atom of the alkylene chloride portion of the unit derived from epichlorohydrin. Accordingly, the substitution of the amine compound is preferably performed before vulcanization.

Any one of the amine compounds, i.e., a primary amine, a secondary amine, and a tertiary amine can be used as the amine compound. Of those, an amine compound formed of a tertiary amine is preferably used because good conductivity is obtained.

When an unreacted amine compound that has not reacted with the chlorine atom of the alkylene chloride portion of the epichlorohydrin rubber remains in the conductive layer, there is a possibility that the compound bleeds toward the surface of the conductive layer over time. Accordingly, after the substitution reaction, the unreacted amine compound is preferably removed from the modified epichlorohydrin rubber by being vaporized through heating. Therefore, the boiling point of the amine compound is preferably 200° C. or less because the removal by heating is facilitated, and is more preferably 160° C. or less. By such reason as described above, R1, R2, and R3 in the amine compound each desirably represent a saturated hydrocarbon group having 1 or more and 18 or less carbon atoms, more preferably 1 or more and 8 or less carbon atoms.

It should be noted that the presence of the quaternary ammonium ion of the modified epichlorohydrin rubber according to the present invention and the number of carbon atoms of an alkyl group of the quaternary ammonium can be confirmed by, for example, proton NMR or carbon NMR.

(Anion)

The anion in the conductive layer functions as a carrier molecule that moves in the conductive layer to cause the conductive layer to express its ionic conductivity. The kind of the anion is not particularly limited, and examples thereof include a chlorine ion, a perchlorate ion, and a bis(trifluoromethanesulfonyl)imide ion. The following formula (5) represents the structure of the bis(trifluoromethanesulfonyl) imide ion.

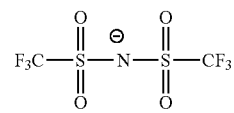

Formula (5)

A method of introducing a desired anion into the conductive layer is, for example, a method involving causing the desired anion to react as a counter anion with the quaternary ammonium ion which the modified epichlorohydrin rubber according to the present invention has. That is, the modified epichlorohydrin rubber obtained by introducing a quaternary ammonium base, which is formed of the desired counter anion to be incorporated into the conductive layer and the quaternary ammonium ion, into an epichlorohydrin rubber is incorporated into the conductive layer. As a result, the quaternary ammonium salt undergoes ionic dissociation in the conductive layer to free the counter anion, and hence the desired anion can be caused to exist in the conductive layer. For example, when the synthesis of the modified epichlorohydrin rubber according to the present invention is performed by the nucleophilic substitution of the chlorine atom of the alkylene chloride portion of the epichlorohydrin rubber with the amine compound, a quaternary ammonium base having a chlorine ion as a counter ion is introduced into the epichlorohydrin rubber. When such modified epichlorohydrin rubber is incorporated into the conductive layer, the quaternary ammonium base undergoes ionic dissociation to free the chlorine ion as the counter ion, and hence the chlorine ion as an anion can be caused to exist in the conductive layer.

On the other hand, a method of causing a perchlorate ion or the bis(trifluoromethanesulfonyl)imide ion represented by the formula (5) to exist in the conductive layer is, for example, a method involving using, as a binder in the conductive layer, a modified epichlorohydrin rubber modified with a quaternary ammonium base into which the desired anion has been introduced as a counter ion. The modified epichlorohydrin rubber modified with the quaternary ammonium base into which the desired anion has been introduced as a counter ion can be prepared by the following method. That is, a modified epichlorohydrin rubber into which a quaternary ammonium base having a chlorine ion as a counter ion has been introduced is prepared. Next, the chlorine ion of the quaternary ammonium base of the modified epichlorohydrin rubber is transformed into the desired anion by utilizing an ion exchange reaction. Thus, the modified epichlorohydrin rubber modified with a quaternary ammonium base into which the desired anion has been introduced as a counter ion can be obtained.

The presence and quantitative determination of the anion as a carrier molecule in the conductive layer can be verified by the extraction of the anion by means of an ion exchange reaction. The modified epichlorohydrin rubber is stirred in hydrochloric acid or a dilute aqueous solution of sodium hydroxide. Thus, the anion in the modified epichlorohydrin rubber is extracted in the aqueous solution. The aqueous solution after the extraction is dried and then the extract is recovered. After that, the extract is subjected to mass spectrometry with a time-of-flight mass spectrometer (TOF-MS). Thus, the identification and quantitative determination of the anion can be performed. It should be noted that even when the anion has a high molecular weight, the anion can be analyzed in the TOF-MS measurement without being decomposed. Further, the identification and quantitative determination of the anion as a carrier molecule are additionally facilitated by performing the elemental analysis of the extract on the basis of inductively coupled plasma (ICP) emission spectrometry and combining the result of the analysis with the result of the mass spectrometry.

(Formation of Conductive Layer)

Figure 2:
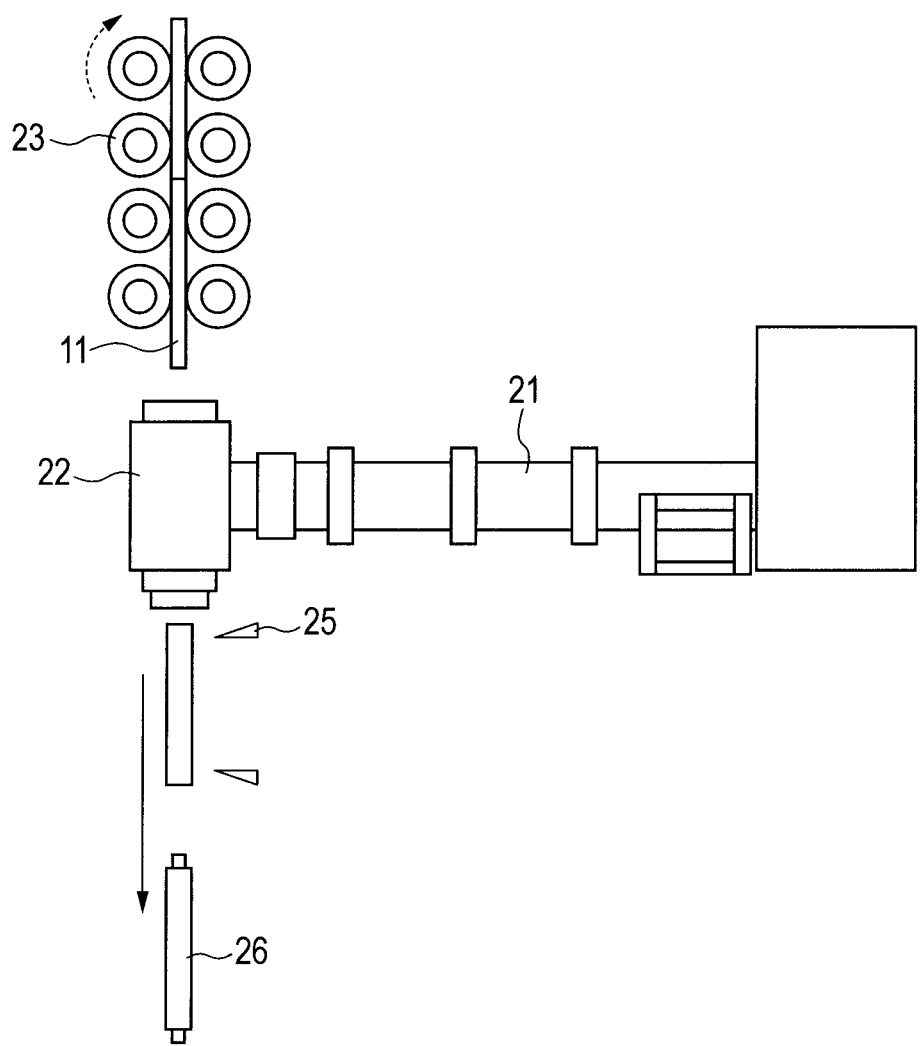
FIG. 2 is a schematic view of a crosshead extruder.

A method of forming the conductive layer is, for example, a method involving molding a rubber composition serving as a raw material for the conductive layer by a known method such as extrusion molding, injection molding, or compression molding. In addition, the conductive layer may be directly formed on the conductive support, or may be formed by covering the top of the conductive support with the conductive layer molded into a tube shape in advance. It should be noted that the shape of the conductive layer is also preferably put in order by polishing its surface after the formation of the conductive layer. FIG. 2 is an explanatory diagram of the step of forming the conductive layer on the periphery of the conductive support by extrusion molding with a crosshead. The conductive supports 11 sequentially taken out of a conductive support-holding container (not shown) are conveyed vertically downward without any gap by multiple pairs of conveying rollers 23 for conveying the conductive supports 11 to be introduced into a crosshead 22. On the other hand, an unvulcanized rubber composition is supplied by an extruder 21 from a direction vertical to the conveying direction of the conductive supports 11 toward the crosshead 22, and is then extruded as a covering layer covering the periphery of each of the conductive supports 11 from the crosshead 22. After that, the covering layer is cut by a cutting remover 25 to be segmented for each conductive support. Thus, an unvulcanized rubber roller 26 is obtained.

The conductive layer is preferably formed into the following crown shape. Its central portion is the thickest and the layer tapers toward each of both of its end portions in order that adhesiveness between a charging roller and an electrophotographic photosensitive member may be secured. The charging roller that has been generally used is brought into abutment with the electrophotographic photosensitive member by applying a predetermined pressing force to each of both end portions of the support. That is, the pressing force at the central portion is small and a larger force is applied to a position as the position approaches each of both the end portions. Accordingly, no problem arises when the straightness of the charging roller is sufficient, but density unevenness may occur in images corresponding to the central portion and both the end portions when the straightness is not sufficient. The crown shape is formed for preventing the unevenness.

In addition, the outer diameter runout of the charging roller is preferably as small as possible in order that an abutting nip width at the time of the rotation of the roller may be uniform.

(Electrophotographic Apparatus)

Figure 4:
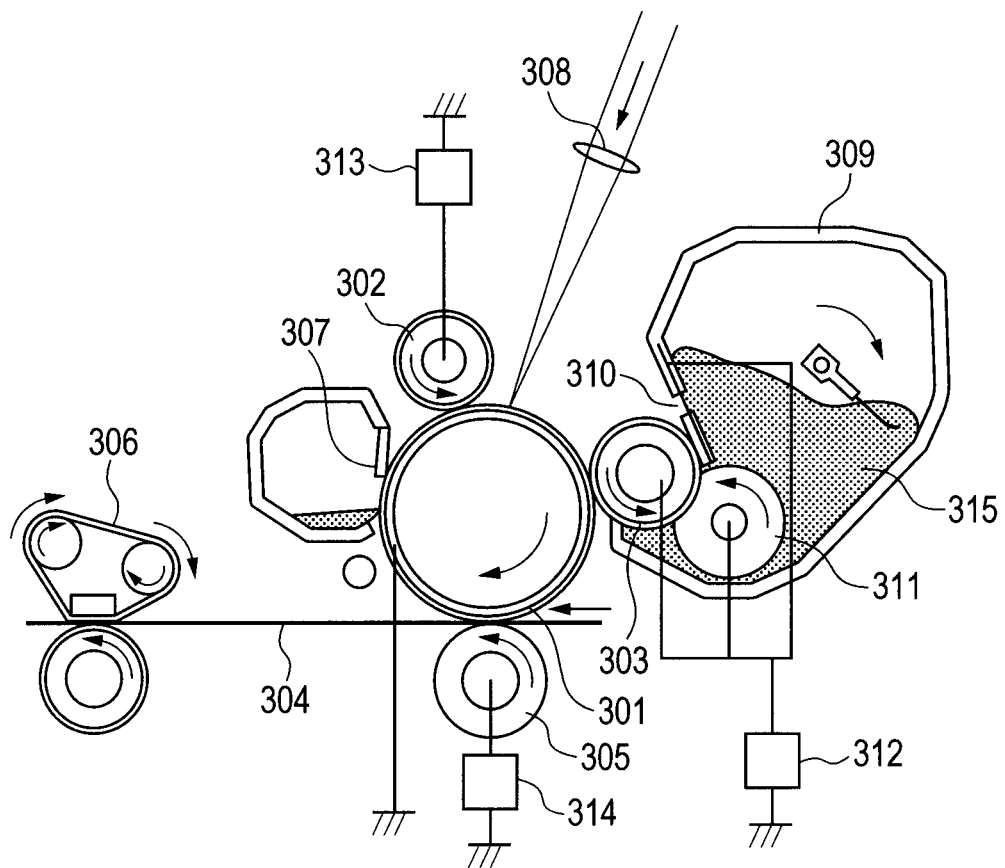
FIG. 4 is an explanatory diagram of an electrophotographic apparatus according to the present invention.

FIG. 4 is a schematic view of an electrophotographic apparatus using the conductive member according to the present invention as a charging roller. The electrophotographic apparatus is constructed of members such as: a charging roller 302 for charging an electrophotographic photosensitive member 301; a latent image-forming apparatus 308 for performing exposure; a developing apparatus 303 for developing a latent image into a toner image; a transferring apparatus 305 for transferring the toner image onto a transfer material 304; a cleaning apparatus 307 for recovering transfer residual toner on the electrophotographic photosensitive member; and a fixing apparatus 306 for fixing the toner image. The electrophotographic photosensitive member 301 is of a rotating drum type having a photosensitive layer on a conductive base body. The electrophotographic photosensitive member 301 is rotationally driven in the direction indicated by an arrow at a predetermined peripheral speed (process speed). The charging roller 302 is placed so as to be brought into contact with the electrophotographic photosensitive member 301 by being pressed against the member with a predetermined force. The charging roller 302 rotates in accordance with the rotation of the electrophotographic photosensitive member 301, and charges the electrophotographic photosensitive member 301 to a predetermined potential through the application of a predetermined DC voltage from a power source 313 for charging. The electrophotographic photosensitive member 301 that has been uniformly charged is irradiated with light 308 corresponding to image information. Thus, an electrostatic latent image is formed. A developer 315 in a developer container 309 is supplied to the surface of the developing roller 303 placed so as to be brought into contact with the electrophotographic photosensitive member 301 by a developer-supplying roller 311. After that, a layer of the developer charged so as to be of the same polarity as that of the charged potential of the electrophotographic photosensitive member is formed on the surface of the developing roller 303 by a developer amount-regulating member 310. The electrostatic latent image formed on the electrophotographic photosensitive member is developed with the developer by reversal development. The transferring apparatus 305 has a contact-type transfer roller. The apparatus transfers the toner image from the electrophotographic photosensitive member 301 to the transfer material 304 such as plain paper. It should be noted that the transfer material 304 is conveyed by a sheet-feeding system having a conveying member. The cleaning apparatus 307 has a blade-type cleaning member and a recovery container, and mechanically scrapes off and recovers the transfer residual toner remaining on the electrophotographic photosensitive member 301 after the transfer. Here, the cleaning apparatus 307 can be omitted by adopting such a simultaneous-with-development cleaning mode that the transfer residual toner is recovered in the developing apparatus 303. The fixing apparatus 306 is constructed of a member such as a heated roll. The apparatus fixes the transferred toner image on the transfer material 304 and then discharges the resultant to the outside of the apparatus. Reference numerals 312 and 314 each represent a DC power source.

(Process Cartridge)

Figure 5:
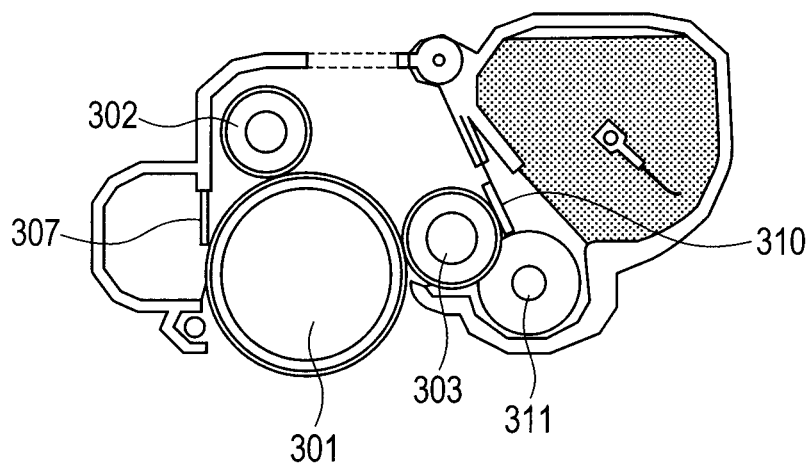
FIG. 5 is an explanatory diagram of a process cartridge according to the present invention.

In addition, FIG. 5 is a schematic sectional view of a process cartridge obtained by applying the conductive member according to the present invention to the charging roller 302. As illustrated in FIG. 5, the process cartridge according to the present invention is such that the electrophotographic photosensitive member 301, the charging roller 302, the developing apparatus 303, the cleaning apparatus 307, and the like are integrated, and is attachably/detachably mounted to the main body of the electrophotographic apparatus.

EXAMPLES

Hereinafter, the present invention is described in detail by way of examples.

It should be noted that in each example, proton NMR and carbon NMR were performed to confirm that the chlorine atom of the alkylene chloride portion of a hydrin unit in a modified epichlorohydrin rubber was substituted with an amine compound.

Example 1

100 Grams of an epichlorohydrin-ethylene oxide-allyl glycidyl ether (EP/EO/AGE) terpolymer (trade name: EPION 301, manufactured by DAISO CO., LTD.) were dissolved in 1,000 ml of N,N-dimethylformamide (DMF). To the solution were added 8 g of a 40-mass % aqueous solution of methylamine (containing 3.2 g of methylamine) and then the mixture was refluxed by heating under a nitrogen atmosphere at a temperature of 50° C. for 12 hours. Next, the reaction liquid was concentrated and exsiccated. Thus, such an EP/EO/AGE terpolymer that a quaternary ammonium ion was introduced into an epichlorohydrin unit portion was obtained. The terpolymer is defined as a modified epichlorohydrin rubber No. 1.

Next, materials shown in Table 1 were added to 100 parts by mass of the modified epichlorohydrin rubber No. 1 and then the contents were mixed with an open roll. Thus, an unvulcanized rubber composition No. 1 was obtained.

TABLE 1

| Material | Part(s) by mass |
| --- | --- |
| Modified epichlorohydrin rubber No. 1 | 100 |
| Zinc oxide (trade name: Zinc Oxide Type 2, manufactured by Seido Chemical Industry Co., Ltd.) | 5 |
| Calcium carbonate (trade name: Silver W, manufactured by SHIRAISHI CALCIUM KAISHA, LTD.) | 35 |
| Carbon black (trade name: Seast SO, manufactured by TOKAI CARBON CO., LTD.) | 8 |
| Processing aid; stearic acid | 2 |
| Plasticizer; adipate (trade name: POLYCIZER W305ELS, manufactured by DIC) | 10 |

TABLE 1-continued

| Material | Part(s) by mass |
| --- | --- |
| Vulcanizing agent; sulfur | 0.5 |
| Crosslinking aid; dipentamethylenethiuram tetrasulfide (trade name: NOCCELER TRA, manufactured by Ouchi Shinko Chemical Industrial Co., Ltd.) | 2 |

On the other hand, a mandrel made of stainless steel having a diameter of 6 mm and a length of 258 mm was prepared and its surface was plated with nickel having a thickness of about 5 μm. Thus, a conductive support was obtained.

Next, the outer peripheral portion of the conductive support was covered with the unvulcanized rubber composition No. 1 by using the apparatus illustrated in FIG. 2. After that, the unvulcanized rubber composition of the outer peripheral portion of the conductive support was cured by being heated in a hot-air oven at a temperature of 160° C. for 1 hour to be turned into a rubber layer. After that, both end portions of the rubber layer were cut. Thus, a conductive roller No. 1 including a rubber layer having a width of 232 mm was obtained. The conductive layer of the conductive roller No. 1 was ground with a wide grinder so that its central outer diameter was 8.5 mm. Thus, a charging roller No. 1 was obtained. The charging roller No. 1 was subjected to Evaluations 1 to 4 to be described below.

(Evaluation 1: Identification of Anion in Conductive Layer)

The conductive layer of the charging roller No. 1 was trimmed off and then dissolved in hydrochloric acid. Thus, an anion in the conductive layer was extracted. The extract was recovered by evaporating water from hydrochloric acid after the extraction and was then subjected to mass spectrometry with a time-of-flight mass spectrometer (trade name: PHI TRIFT IV, manufactured by ULVAC-PHI, Inc.). Thus, the main anion species in the conductive layer was identified.

(Evaluation 2: Measurement of Electrical Resistance Value)

Figure 3:
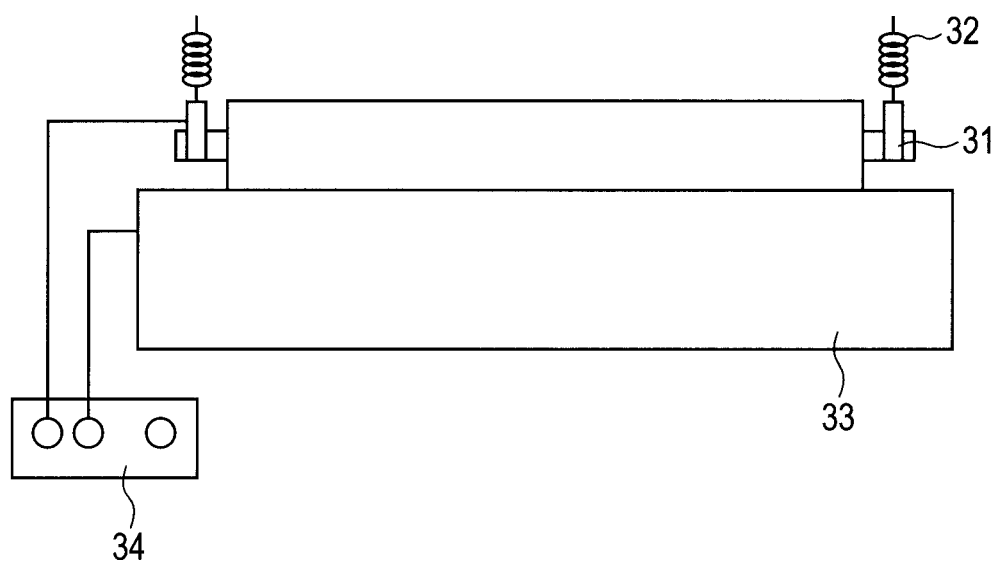
FIG. 3 is a schematic view of an apparatus for measuring the electrical resistance of a conductive member.

FIG. 3 illustrates a schematic view of an electrical resistance-measuring apparatus used in this evaluation. The charging roller No. 1 is rotatably held by bearings 31 attached to both ends thereof and is brought into press contact with a columnar drum 33 made of aluminum having an outer diameter of 30 mm by springs 32 attached to the bearings 31 at an indentation pressure of 450 gf on each side.

Then, the columnar drum 33 was rotationally driven at a rotational frequency of 33 rpm to cause the charging roller No. 1 to rotate in accordance with the rotation. A voltage was applied from an external DC power supply 34 (trade name: Model 610E; manufactured by TReK) to the charging roller No. 1 through the drum 33 according to a constant current control mode for 305 seconds so that a DC current of 50 ρA flowed. At this time, output voltages at an initial stage (5 seconds after a lapse of 2 seconds from the application) and after a lapse of 300 seconds (5 seconds after a lapse of 300 seconds) were measured at a sampling frequency of 100 Hz.

The average of the output voltages at the initial stage was represented by Va (V), the average of the output voltages after a lapse of 300 seconds was represented by Vb (V), and the initial voltage Va and a voltage change ratio Vb/Va were measured. Here, the Va was 25.2 (V) and hence the charging roller showed good conductivity. In addition, the Vb/Va was 1.14 and hence the charging roller was found to show nearly no change in its electrical resistance value.

(Evaluation 3: Image Evaluation)

A DC current of 300 μA was flowed through the charging roller No. 1 with the electrical resistance-measuring apparatus of Evaluation 1 for 100 minutes. Next, the charging roller No. 1 was incorporated as a charging roller into a laser printer (trade name: LBP5400, manufactured by Canon Inc.) and then 1 halftone image was output. The halftone image was visually observed and evaluated by criteria shown in Table 2 below.

TABLE 2

| Rank | Evaluation criterion |
|---|---|
| A | No image failure ascribable to the charging roller is observed. |
| B | An image failure ascribable to the charging roller was observed to some extent but is at a slight level. |
| C | An image failure ascribable to the charging roller was observed. |

(Evaluation 4: Presence or Absence of Adhesion of Bleeding Product)

The charging roller No. 1 was placed on a polyethylene terephthalate (PET) sheet under an environment having a temperature of 40° C. and a humidity of 95% RH. A load of 550 gf was applied to the exposed portion of the mandrel at each of both ends of the charging roller No. 1 to press the surface of the conductive layer of the charging roller No. 1 against the PET sheet. After the state had been maintained for 1 week, the charging roller No. 1 was removed from the PET sheet and then the portion of the surface of the PET sheet against which the charging roller No. 1 had been pressed was observed with an optical microscope. A situation where a product bleeding from the conductive layer of the charging roller No. 1 adhered was observed and evaluated on the basis of criteria shown in Table 3 below.

TABLE 3

| Rank | Evaluation criterion |
|---|---|
| A | No bleeding product is observed in the abutting portion. |
| B | Slight clouding is observed in part of the abutting portion. |
| C | A bleeding product is observed in the entire surface of the abutting portion. |

Example 2 to Example 12

Modified epichlorohydrin rubbers No. 2 to No. 12 were synthesized in the same manner as in the modified epichlorohydrin rubber No. 1 according to Example 1 except that the epichlorohydrin rubber as a raw material, the kind of amine used in the modification, and the addition amount of the amine were changed as shown in Table 4. It should be noted that an alphabetical letter for the kind of epichlorohydrin rubber as a raw material in Table 4 represents a material shown in Table 5. Next, unvulcanized rubber compositions No. 2 to No. 12 were prepared in the same manner as in Example 1 except that the resultant modified epichlorohydrin rubbers No. 2 to No. 12 were used, and then charging rollers No. 2 to No. 12 were produced with the compositions. Those charging rollers were subjected to Evaluations 1 to 3 of Example 1.

TABLE 4

| Example | Modified epichlorohydrin rubber No. | Epichlorohydrin rubber as raw material | Amine Kind | Actual addition amount (g) |
|---|---|---|---|---|
| 1 | 1 | J | Methylamine | 3.2 |
| 2 | 2 | | Dimethylamine | 4.7 |
| 3 | 3 | | Trimethylamine | 6.0 |
| 4 | 4 | | Ethylamine | 4.6 |
| 5 | 5 | | Diethylamine | 5.8 |
| 6 | 6 | | Dimethylethylamine | 5.8 |
| 7 | 7 | | Propylamine | 4.7 |
| 8 | 8 | E | Methylamine | 3.2 |
| 9 | 9 | | Trimethylamine | 6.0 |
| 10 | 10 | | Ethylamine | 4.6 |
| 11 | 11 | | Dimethylethylamine | 5.8 |
| 12 | 12 | | Propylamine | 4.7 |

TABLE 5

Epichlorohydrin rubber as raw material

| Kind | Material name and the like |
|---|---|
| A | Homopolymer of EP (trade name: EPICHLOMER H, manufactured by DAISO CO., LTD.) |
| B | Bipolymer of EP and EO (trade name: EPICHLOMER C, manufactured by DAISO CO., LTD.) |
| C | Bipolymer of EP and EO (trade name: EPICHLOMER D, manufactured by DAISO CO., LTD.) |
| D | Terpolymer of EP, EO, and AGE (trade name: EPICHLOMER CG, manufactured by DAISO CO., LTD.) |
| E | Terpolymer of EP, EO, and AGE (trade name: EPICHLOMER CG102, manufactured by DAISO CO., LTD.) |
| F | Terpolymer of EP, EO, and AGE (trade name: EPICHLOMER CG104, manufactured by DAISO CO., LTD.) |
| G | Terpolymer of EP, EO, and AGE (trade name: EPICHLOMER CG105, manufactured by DAISO CO., LTD.) |
| H | Terpolymer of EP, EO, and AGE (trade name: EPICHLOMER CG107, manufactured by DAISO CO., LTD.) |
| I | Zecron (trade name, manufactured by ZEON CORPORATION) |
| J | EPION 301 (trade name, manufactured by DAISO CO., LTD.) |

EP: Epichlorohydrin
EO: Ethylene oxide
AGE: Allyl glycidyl ether

Example 13

100 Grams of the epichlorohydrin rubber J as a raw material and 8.1 g of triethylamine were mixed with an open roll. Thus, a modified epichlorohydrin rubber No. 13 was obtained. An unvulcanized rubber composition No. 13 was prepared in the same manner as in Example 1 except that the resultant modified epichlorohydrin rubber No. 13 was used, and then a charging roller No. 13 was produced with the compositions. This charging roller was subjected to Evaluations 1 to 3 of Example 1.

Examples 14 to 44

Modified epichlorohydrin rubbers No. 14 to No. 44 were synthesized in the same manner as in the modified epichlorohydrin rubber No. 1 according to Example 1 except that the epichlorohydrin rubber as a raw material, the kind of amine used in the modification, and the addition amount of the amine were changed as shown in Table 6.

Next, unvulcanized rubber compositions No. 14 to No. 44 were prepared in the same manner as in Example 1 except that the resultant modified epichlorohydrin rubbers No. 14 to No. 44 were used, and then charging rollers No. 14 to No. 44 were produced with the compositions. Those charging rollers were subjected to Evaluations 1 to 3 of Example 1.

TABLE 6

| Example | Modified epichlorohydrin rubber No. | Epichlorohydrin rubber as raw material | Amine Kind | Actual addition amount (g) |
|---|---|---|---|---|
| 13 | 13 | J | Triethylamine | 8.1 |
| 14 | 14 | | Triethylamine | 4.1 |
| 15 | 15 | | Triethylamine | 16.0 |
| 16 | 16 | | Dipropylamine | 8.1 |
| 17 | 17 | | Tripropylamine | 11.4 |
| 18 | 18 | | Butylamine | 5.8 |
| 19 | 19 | | Dibutylamine | 10.3 |
| 20 | 20 | | Butyldimethylamine | 8.1 |
| 21 | 21 | | Dimethylhexylamine | 10.3 |
| 22 | 22 | | Dimethylhexylamine | 5.2 |
| 23 | 23 | | Dimethylhexylamine | 20.6 |
| 24 | 24 | | Hexylamine | 8.1 |
| 25 | 25 | | Methyldioctylamine | 20.4 |
| 26 | 26 | | Dimethyldodecylamine | 17.0 |
| 27 | 27 | | Dimethyloctadecylamine | 23.8 |
| 28 | 28 | E | Triethylamine | 6.6 |
| 29 | 29 | | Tripropylamine | 11.4 |
| 30 | 30 | | Butylamine | 5.8 |
| 31 | 31 | | Butyldimethylamine | 8.1 |
| 32 | 32 | | Dimethylhexylamine | 10.3 |
| 33 | 33 | | Hexylamine | 8.1 |
| 34 | 34 | | Methyldioctylamine | 20.4 |
| 35 | 35 | | Dimethyldodecylamine | 17.0 |
| 36 | 36 | | Dimethyloctadecylamine | 23.8 |
| 37 | 37 | D | Triethylamine | 8.1 |
| 38 | 38 | F | Triethylamine | 8.1 |
| 39 | 39 | I | Triethylamine | 8.1 |
| 40 | 40 | D | Dimethylhexylamine | 10.3 |
| 41 | 41 | F | Dimethylhexylamine | 10.3 |
| 42 | 42 | G | Dimethylhexylamine | 10.3 |
| 43 | 43 | H | Dimethylhexylamine | 10.3 |
| 44 | 44 | I | Dimethylhexylamine | 10.3 |

Example 45

100 Grams of the epichlorohydrin rubber A as a raw material and 10.3 g of dimethylhextlamine were mixed with an open roll. Thus, a modified epichlorohydrin rubber No. 45 was obtained.

Next, materials shown in Table 7 below were mixed with an open roll. Thus, an unvulcanized rubber composition No. 45 was obtained.

TABLE 7

| Material | Part(s) by mass |
|---|---|
| Modified epichlorohydrin rubber No. 45 | 100 |
| Dicumyl peroxide | 5 |
| Calcium carbonate (trade name: Silver W, manufactured by SHIRAISHI CALCIUM KAISHA, LTD.) | 35 |
| Carbon black (trade name: Seast SO, manufactured by TOKAI CARBON CO., LTD.) | 8 |
| Processing aid; stearic acid | 2 |
| Plasticizer; adipate (trade name: POLYCIZER W305ELS, manufactured by DIC) | 10 |
| Vulcanizing agent; sulfur | 0.5 |
| Crosslinking aid; dipentamethylenethiuram tetrasulfide (trade name: NOCCELER TRA, manufactured by Ouchi Shinko Chemical Industrial Co., Ltd.) | 2 |

On the other hand, a mandrel made of stainless steel having an outer diameter of 6 mm and a length of 258 mm was prepared and its surface was plated with nickel having a thickness of about 5 μm. The mandrel was set in the center of a tubular die having an inner diameter of 8.5 mm, and then the unvulcanized rubber composition No. 45 was placed between the conductive support and the die. The resultant was heated with a steam vulcanizer in water vapor having a temperature of 160° C. for 40 minutes. Thus, the unvulcanized rubber composition No. 45 was subjected to primary vulcanization. Next, the vulcanized product was heated in an electric oven having a temperature of 150° C. for 1 hour to be turned into a rubber layer. After that, both end portions of the rubber layer were cut. Thus, a conductive roller No. 45 including a rubber layer having a width of 232 mm was obtained. The surface of the rubber layer of the conductive roller No. 45 was ground in the same manner as in Example 1. Thus, a charging roller No. 45 was obtained. The charging roller was subjected to Evaluations 1 to 3.

Examples 46 and 47

Modified epichlorohydrin rubbers No. 46 and No. 47 were synthesized in the same manner as in Example 45 except that the epichlorohydrin rubber A as a raw material in Example 45 was changed to the epichlorohydrin rubber B or the epichlorohydrin rubber C shown in Table 5. Next, unvulcanized rubber compositions No. 46 and No. 47 were prepared in the same manner as in Example 1 except that the resultant modified epichlorohydrin rubbers No. 46 and No. 47 were used, and then charging rollers No. 46 and No. 47 were produced with the compositions. Those charging rollers were subjected to Evaluations 1 to 3 of Example 1.

Example 48

100 Grams of the epichlorohydrin rubber J as a raw material were dissolved in 1,000 ml of N,N-dimethylformamide (DMF). 31.7 Grams of potassium phthalimide were added to the solution and then the mixture was refluxed by heating under a nitrogen atmosphere at a temperature of 70° C. for 12 hours. Methanol was added to the reaction liquid to precipitate the reaction product and then unreacted potassium phthalimide was removed. The epichlorohydrin rubber to which the phthalimide had been added was dissolved in 1,000 ml of N,N-dimethylformamide again. 11 Milliliters of hydrazine monohydrate were added to the solution and then the mixture was refluxed by heating at a temperature of 70° C. for 12 hours. After the completion of the reaction, methanol was added to the reaction liquid to precipitate the reaction product. Thus, a modified epichlorohydrin rubber No. 48 was obtained. Next, an unvulcanized rubber composition No. 48 was prepared in the same manner as in Example 1 except that the resultant modified epichlorohydrin rubber No. 48 was used, and then a charging roller No. 48 was produced with the composition. The charging roller was subjected to Evaluations 1 to 3 of Example 1.

Example 49

100 Grams of the modified epichlorohydrin rubber No. 3 in Example 3 were dissolved in 1,000 ml of N,N-dimethylformamide (DMF). Next, 11 g of lithium perchlorate were dissolved in 10 ml of DMF. The resultant two kinds of DMF solutions were mixed and then stirred for 2 hours. After having been mixed and stirred, the DMF solutions were poured into water, which was being stirred at room temperature, to be reprecipitated. The reprecipitation and washing with water were repeated twice each, and then the resultant was dried. Thus, an unvulcanized rubber composition No. 49 containing a perchlorate ion ($ClO_4^-$) was obtained. Next, a charging roller No. 49 was produced with the resultant unvulcanized rubber composition No. 49. The charging roller was subjected to Evaluations 1 to 3 of Example 1.

Example 50

An unvulcanized rubber composition No. 50 containing a bis(trifluoromethanesulfonyl)imide ion ($TFSI^-$) was prepared in the same manner as in Example 49 except that 29 g of lithium bis(trifluoromethanesulfonyl)imide were used instead of lithium perchlorate of Example 49, and then a charging roller No. 50 was produced with the composition. The charging roller was subjected to Evaluations 1 to 3 of Example 1.

Comparative Example 1

Materials shown in Table 8 below were mixed with an open roll. Thus, an unvulcanized rubber composition No. C-1 was obtained. A charging roller No. C-1 was produced in the same manner as in Example 1 except that the unvulcanized rubber composition No. C-1 was used. The charging roller was subjected to Evaluations 1 to 3 of Example 1.

TABLE 8

| Material | Part(s) by mass |
|---|---|
| Epichlorohydrin rubber J as raw material | 100 |
| Zinc oxide (trade name: Zinc Oxide Type 2, manufactured by Seido Chemical Industry Co., Ltd.) | 5 |
| Calcium carbonate (trade name: Silver W, manufactured by SHIRAISHI CALCIUM KAISHA, LTD.) | 35 |

TABLE 8-continued

| Material | Part(s) by mass |
|---|---|
| Carbon black (trade name: Seast SO, manufactured by TOKAI CARBON CO., LTD.) | 8 |
| Processing aid; stearic acid | 2 |
| Plasticizer; adipate (trade name: POLYCIZER W305ELS, manufactured by DIC) | 10 |
| Vulcanizing agent; sulfur | 0.5 |
| Crosslinking aid; dipentamethylenethiuram tetrasulfide (trade name: NOCCELER TRA, manufactured by Ouchi Shinko Chemical Industrial Co., Ltd.) | 2 |
| Tetraethylammonium chloride | 3 |

Comparative Example 2

An unvulcanized rubber composition No. C-2 was obtained in the same manner as in Comparative Example 1 except that tetraethylammonium chloride was not compounded in Comparative Example 1. A charging roller No. C-2 was produced in the same manner as in Example 1 except that the unvulcanized rubber composition No. C-2 was used. The charging roller was subjected to Evaluations 1 to 3 of Example 1.

Comparative Example 3

An unvulcanized rubber composition No. C-3 was obtained in the same manner as in Comparative Example 2 except that 18 g of triethylamine were added upon mixing with the open roll in Comparative Example 2. A charging roller No. C-3 was produced in the same manner as in Example 1 except that the unvulcanized rubber composition No. C-3 was used. The charging roller was subjected to Evaluations 1 to 3 of Example 1. Table 9-1 and Table 9-2 show the results of the evaluations of the charging rollers No. 1 to No. 50 according to Examples 1 to 50. In addition, Table 9-3 shows the results of the evaluations of the charging rollers No. C-1 to No. C-3 according to Comparative Examples 1 to 3.

TABLE 9-1

| Example | Charging roller No. | Evaluation 1 Anion species | Evaluation 2 Va (V) | Vb/Va | Evaluation 3 | Evaluation 4 |
|---|---|---|---|---|---|---|
| 1 | 1 | $Cl^-$ | 25.2 | 1.14 | A | A |
| 2 | 2 | $Cl^-$ | 40.4 | 1.22 | B | B |
| 3 | 3 | $Cl^-$ | 22.1 | 1.05 | A | A |
| 4 | 4 | $Cl^-$ | 26.1 | 1.16 | A | A |
| 5 | 5 | $Cl^-$ | 41.2 | 1.21 | B | A |
| 6 | 6 | $Cl^-$ | 24.0 | 1.15 | A | A |
| 7 | 7 | $Cl^-$ | 30.0 | 1.17 | A | A |
| 8 | 8 | $Cl^-$ | 26.1 | 1.15 | A | A |
| 9 | 9 | $Cl^-$ | 24.4 | 1.11 | A | A |
| 10 | 10 | $Cl^-$ | 25.0 | 1.14 | A | A |
| 11 | 11 | $Cl^-$ | 25.3 | 1.15 | A | A |
| 12 | 12 | $Cl^-$ | 25.5 | 1.16 | A | A |
| 13 | 13 | $Cl^-$ | 28.5 | 1.12 | A | A |
| 14 | 14 | $Cl^-$ | 41.3 | 1.22 | B | A |
| 15 | 15 | $Cl^-$ | 22.2 | 1.08 | A | A |
| 16 | 16 | $Cl^-$ | 42.2 | 1.21 | B | A |
| 17 | 17 | $Cl^-$ | 30.1 | 1.11 | A | A |
| 18 | 18 | $Cl^-$ | 30.5 | 1.11 | A | A |
| 19 | 19 | $Cl^-$ | 44.5 | 1.22 | B | B |
| 20 | 20 | $Cl^-$ | 28.4 | 1.15 | A | A |
| 21 | 21 | $Cl^-$ | 29.8 | 1.16 | A | A |
| 22 | 22 | $Cl^-$ | 43.1 | 1.22 | B | B |
| 23 | 23 | $Cl^-$ | 26.0 | 1.14 | A | A |

TABLE 9-2

| Example | Charging roller No. | Evaluation 1 Anion species | Evaluation 2 Va (V) | Vb/Va | Evaluation 3 | Evaluation 4 |
|---|---|---|---|---|---|---|
| 24 | 24 | Cl$^-$ | 27.1 | 1.19 | A | A |
| 25 | 25 | Cl$^-$ | 42.0 | 1.22 | B | A |
| 26 | 26 | Cl$^-$ | 42.0 | 1.20 | B | A |
| 27 | 27 | Cl$^-$ | 43.5 | 1.23 | B | B |
| 28 | 28 | Cl$^-$ | 28.5 | 1.15 | A | A |
| 29 | 29 | Cl$^-$ | 30.9 | 1.14 | A | A |
| 30 | 30 | Cl$^-$ | 31.2 | 1.16 | A | A |
| 31 | 31 | Cl$^-$ | 45.5 | 1.20 | A | A |
| 32 | 32 | Cl$^-$ | 30.2 | 1.19 | A | A |
| 33 | 33 | Cl$^-$ | 29.0 | 1.20 | A | A |
| 34 | 34 | Cl$^-$ | 43.2 | 1.24 | B | A |
| 35 | 35 | Cl$^-$ | 43.5 | 1.23 | B | B |
| 36 | 36 | Cl$^-$ | 44.5 | 1.25 | B | B |
| 37 | 37 | Cl$^-$ | 29.5 | 1.18 | A | A |
| 38 | 38 | Cl$^-$ | 30.1 | 1.19 | A | A |
| 39 | 39 | Cl$^-$ | 30.2 | 1.20 | A | A |
| 40 | 40 | Cl$^-$ | 30.5 | 1.19 | A | A |
| 41 | 41 | Cl$^-$ | 30.7 | 1.20 | A | A |
| 42 | 42 | Cl$^-$ | 30.0 | 1.18 | A | A |
| 43 | 43 | Cl$^-$ | 31.5 | 1.20 | A | A |
| 44 | 44 | Cl$^-$ | 32.4 | 1.20 | A | A |
| 45 | 45 | Cl$^-$ | 55.0 | 1.19 | B | A |
| 46 | 46 | Cl$^-$ | 49.5 | 1.21 | B | A |
| 47 | 47 | Cl$^-$ | 48.2 | 1.21 | B | A |
| 48 | 48 | Cl$^-$ | 35.9 | 1.20 | B | A |
| 49 | 49 | ClO$_4^-$ | 20.3 | 1.04 | A | A |
| 50 | 50 | TFSI$^-$ | 18.1 | 1.02 | A | A |

TABLE 9-3

| Comparative Example | Charging roller No. | Evaluation 1 Anion species | Evaluation 2 Va (V) | Vb/Va | Evaluation 3 | Evaluation 4 |
|---|---|---|---|---|---|---|
| 1 | C-1 | Cl$^-$ | 35.2 | 3.52 | C | A |
| 2 | C-2 | Cl$^-$ | 189.2 | 10.29 | C | A |
| 3 | C-3 | Cl$^-$ | 52.5 | 7.50 | C | C |

As can be seen from Tables 9-1 to 9-3, the charging roller No. C-1 according to Comparative Example 1 had a Vb/Va of 3.52, i.e., its resistance increased owing to energization, though the roller had a Va of 35.2 (V) and hence showed good conductivity. In addition, as a result, an image failure that seemed to be ascribable to the change of the electrical resistance value of the charging roller occurred in Evaluation 2. In addition, as a result of Evaluation 3, an exuding product was observed in its entire surface.

Example 51

A primer layer was baked on the peripheral surface of a mandrel made of stainless steel having a diameter of 6 mm and a length of 279 mm on which a primer had been baked. A conductive roller No. 51 was produced in the same manner as in the conductive roller No. 1 according to Example 1 by using the resultant as a conductive support and by using the unvulcanized rubber composition No. 13 except that the thickness of the rubber layer was changed to 3 mm and the width of the rubber layer was changed to 235 mm.

The conductive roller No. 51 was subjected to Evaluations 1 and 2, and Evaluation 5 to be described below.

(Evaluation 5: Image Evaluation)

The conductive roller No. 51 was incorporated as a developing roller for a laser printer (trade name: LBP5400, manufactured by Canon Inc.), and then 1 cyan solid image and 1 halftone image were output. Those images are defined as an evaluation image group a. Next, the conductive roller No. 51 was taken out of the laser printer, and then a DC current of 400 µA was flowed through the conductive roller No. 51 with the electrical resistance-measuring apparatus used in Evaluation 1 for 120 minutes. The conductive roller No. 51 was incorporated as the developing roller for the laser printer (trade name: LBP5400, manufactured by Canon Inc.) again, and then 1 cyan solid image and 1 halftone image were output. Those images are defined as an evaluation image group b. The evaluation image group a and the evaluation image group b were visually observed and evaluated by the following criteria.

A: No density change was observed between the evaluation image group a and the evaluation image group b.
B: A slight density change was observed between the evaluation image group a and the evaluation image group b.
C: A remarkable density change was observed between the evaluation image group a and the evaluation image group b.

Examples 52 to 54 and Comparative Example 4

Conductive rollers No. 52 to No. 54 and No. C-4 were produced in the same manner as in Example 51 by changing the polymer to be used in the unvulcanized rubber composition and the amine to those shown in Table 10, and then the rollers were subjected to Evaluations 1 and 2, and Evaluation 5. Table 11 shows the results.

TABLE 10

| | Unvulcanized rubber composition No. | Epichlorohydrin rubber as raw material | Amine Kind | Amine Actual addition amount (g) |
|---|---|---|---|---|
| Example 51 | 51 | J | Triethylamine | 8.1 |
| Example 52 | 52 | E | Dimethylhexylamine | 10.3 |
| Example 53 | 53 | J | Dimethylamine | 4.7 |
| Example 54 | 54 | E | Dimethylhexylamine | 10.3 |
| Comparative Example 4 | C-4 | J | — | — |

TABLE 11

| | Conductive roller No. | Evaluation 1 Anion species | Evaluation 2 Va (V) | Evaluation 2 Vb/Va | Evaluation 5 |
|---|---|---|---|---|---|
| Example 51 | 51 | Cl⁻ | 29.8 | 1.15 | A |
| Example 52 | 52 | Cl⁻ | 33.0 | 1.22 | A |
| Example 53 | 53 | Cl⁻ | 42.4 | 1.26 | B |
| Example 54 | 54 | Cl⁻ | 32.6 | 1.29 | B |
| Comparative Example 4 | C-4 | Cl⁻ | 37.3 | 3.88 | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-072404, filed Mar. 29, 2011, which is hereby incorporated by reference herein in its entirety.

What is claimed is:

1. A charging roller for electrophotography, which is brought into abutment with an electrophotographic photosensitive member, the charging roller comprising a conductive support and a conductive layer, wherein the conductive layer has a crown shape, the conductive layer comprises an anion and a vulcanized modified epichlorohydrin rubber which is obtained by
(i) providing an unmodified epichlorohydrin rubber having units represented by formulae (2), (3), and (4)

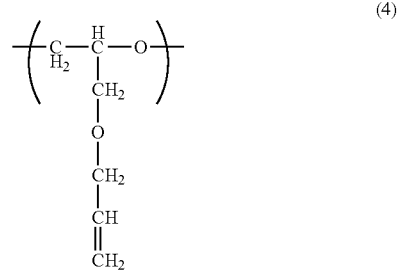

where n represents an integer of 1 to 3, and

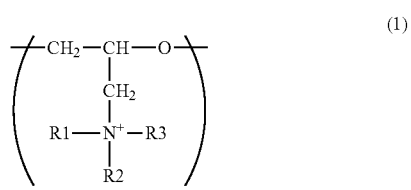

(ii) reacting an amine compound with the unmodified epichlorohydrin rubber such that the chlorine atom in a unit of the unmodified epichlorohydrin rubber according to for formula (2) is dechlorinated via a nucleophilic substitution with the amine compound to obtain a modified epichlorohydrin rubber having units represented by formulae (3) and (4), and having a unit represented by formula (1)

$$\left(\begin{array}{c}-CH_2-CH-O-\\ |\\ CH_2\\ |\\ R1-N^+-R3\\ |\\ R2\end{array}\right) \quad (1)$$

where R1, R2, and R3 independently represent hydrogen or a saturated hydrocarbon group having 1 to 18 carbon atoms, and (iii) vulcanizing the modified epichlorohydrin rubber.

2. The charging roller according to claim 1, wherein R1, R2 and R3 are independently a saturated hydrocarbon group having 1 to 18 carbon atoms.

3. The charging roller cording to claim 2, wherein R1, R2 and R3 are independently saturated hydrocarbon group having 1 to 8 carbon atoms.

4. The charging member according to claim 1, wherein the anion is a chloride anion.

5. A process cartridge which is attachably/detachably mounted to a main body of an electrophotographic apparatus, the process cartridge comprising:

an electrophotographic photosensitive member; and a charging roller comprising a conductive support and a conductive layer, the charging roller being brought into abutment with the electrophotographic photosensitive member by applying a pressing force to both end portions of the conductive support, wherein the conductive layer has a crown shape, the conductive layer comprises an anion and a vulcanized modified epichlorohydrin rubber which is obtained by
(i) providing an unmodified epichlorohydrin rubber having units represented by formulae (2), (3), and (4)

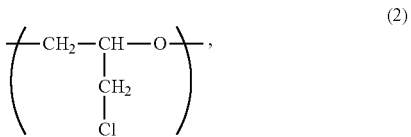

-continued

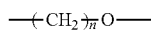
(3)

where n represents an integer of 1 to 3, and

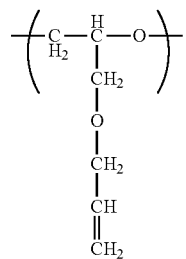
(4)

(ii) reacting an amine compound with the unmodified epichlorohydrin rubber such that the chlorine atom in a unit of the unmodified epichlorohydrin rubber according to formula (2) is dechlorinated via a nucleophilic substitution with the amine compound to obtain a modified epichlorohydrin rubber having units represented by formulae (3) and (4), and having a unit represented by formula (1)

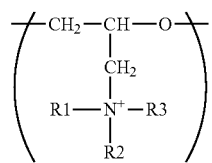
(1)

where R1, R2, and R3 independently represent hydrogen or a saturated hydrocarbon group having 1 to 18 carbon atoms, and (iii) vulcanizing the modified epichlorohydrin rubber.

6. An electrophotographic apparatus, comprising:
an electrophotographic photosensitive member; and
a charging roller which comprises a conductive support and a conductive layer, the charging roller being brought into abutment with the electrophotographic photosensitive member by applying a pressing force to both end portions of the conductive support, wherein
the conductive layer has a crown shape,
the conductive layer comprises an anion and a vulcanized modified epichlorohydrin rubber which is obtained by (i) providing an unmodified epichlorohydrin rubber having units represented by formulae (2), (3), and (4)

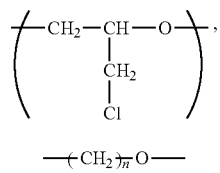
(2)

(3)

where n represents an integer of 1 to 3, and

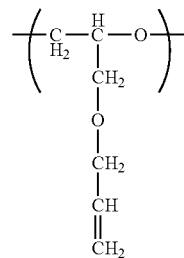
(4)

(ii) reacting an amine compound with the unmodified epichlorohydrin rubber such that the chlorine atom in a unit of the unmodified epichlorohydrin rubber according to formula (2) is dechlorinated via a nucleophilic substitution with the amine compound to obtain a modified epichlorohydrin rubber having units represented by formulae (3) and (4), and having a unit represented by formula (1)

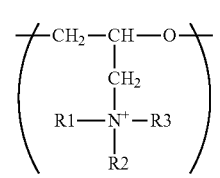
(1)

where R1, R2, and R3 independently represent hydrogen or a saturated hydrocarbon group having 1 to 18 carbon atoms, and (iii) vulcanizing the modified epichlorohydrin rubber.

* * * * *